US006308817B1

(12) United States Patent
Corniani et al.

(10) Patent No.: US 6,308,817 B1
(45) Date of Patent: Oct. 30, 2001

(54) METHOD AND UNIT FOR FORMING A GROUP OF PRODUCTS ON A CARTONING MACHINE

(75) Inventors: Carlo Corniani, Marmirolo; Roberto Risi, Casalecchio di Reno; Attilio Maggi, Ponti sul Mincio, all of (IT)

(73) Assignee: Azionario Costruzioni Macchine Automatiche A.C.M.A. S.p.A., Bologna (IT)

( * ) Notice: Subject to any disclaimer, the term of this patent is extended or adjusted under 35 U.S.C. 154(b) by 0 days.

(21) Appl. No.: 09/416,612

(22) Filed: Oct. 12, 1999

(30) Foreign Application Priority Data

Oct. 23, 1998  (IT) .............................................. B098A0573

(51) Int. Cl.$^7$ .................................................. B65G 47/26
(52) U.S. Cl. ............................ 198/419.3; 53/448; 53/543
(58) Field of Search .............................. 198/418.1, 419.3, 198/458, 467.1, 625; 53/448, 154, 543

(56) References Cited

U.S. PATENT DOCUMENTS 4,637,509 * 1/1987 Raudat et al. .................... 198/419.3
4,642,967 * 2/1987 Culpepper ......................... 198/419.3
5,056,298   10/1991 Deadmond ............................. 53/534
5,148,654    9/1992 Kisters ................................... 53/462
5,667,055    9/1997 Gambetti ......................... 198/419.3
5,701,726 * 12/1997 Smith ................................ 198/419.3

FOREIGN PATENT DOCUMENTS 9306597   7/1993  (DE) .
6902462   8/1970  (NL) .

OTHER PUBLICATIONS

Derwent Abstract of NL 6902462 dated Aug. 19, 1970.

* cited by examiner

Primary Examiner—Joseph E. Valenza
(74) Attorney, Agent, or Firm—Ladas & Parry

(57) ABSTRACT

A method and unit for forming, on a cartoning machine, a group having at least one row defined by a given number of products, whereby an orderly succession of products, traveling at a substantially constant first speed, is fed to conveyor traveling at a substantially constant second speed greater than the first speed; a leading product in the succession is braked on the conveyor until a portion of the succession corresponding to the row being formed moves onto the conveyor; and the leading product in the row is then released gradually to accelerate the row up to the second speed and detach the row from the rest of the succession.

25 Claims, 5 Drawing Sheets

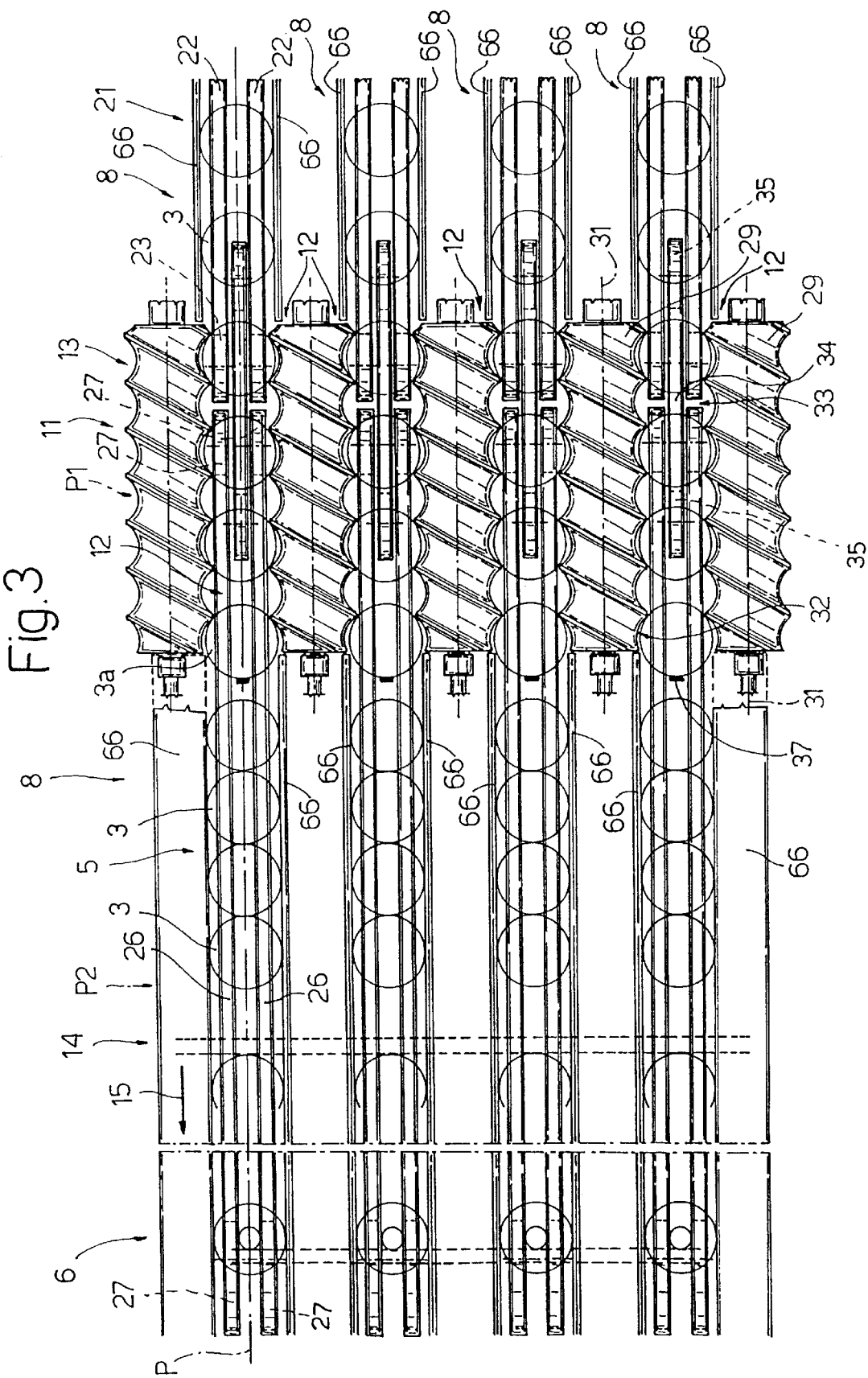

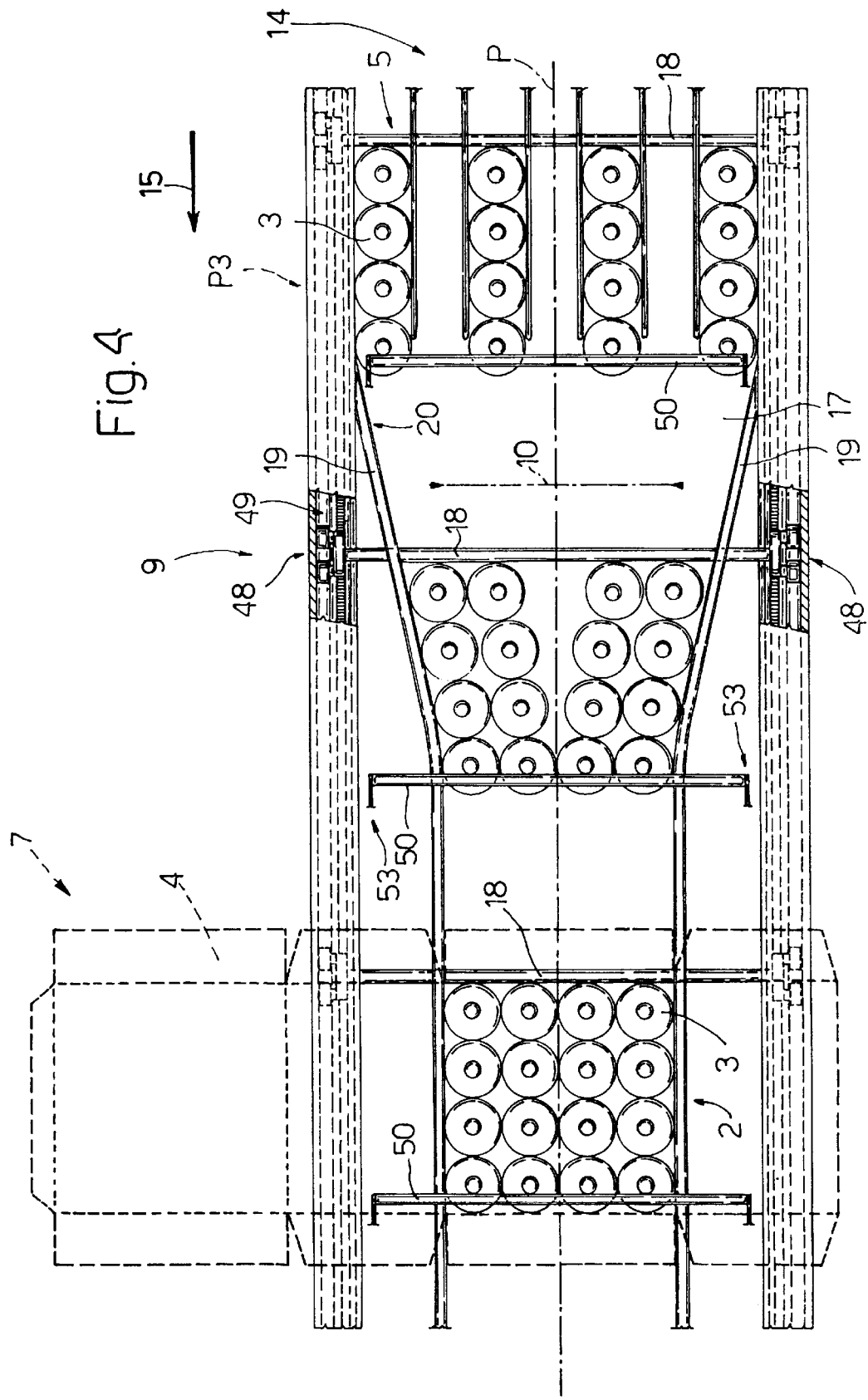

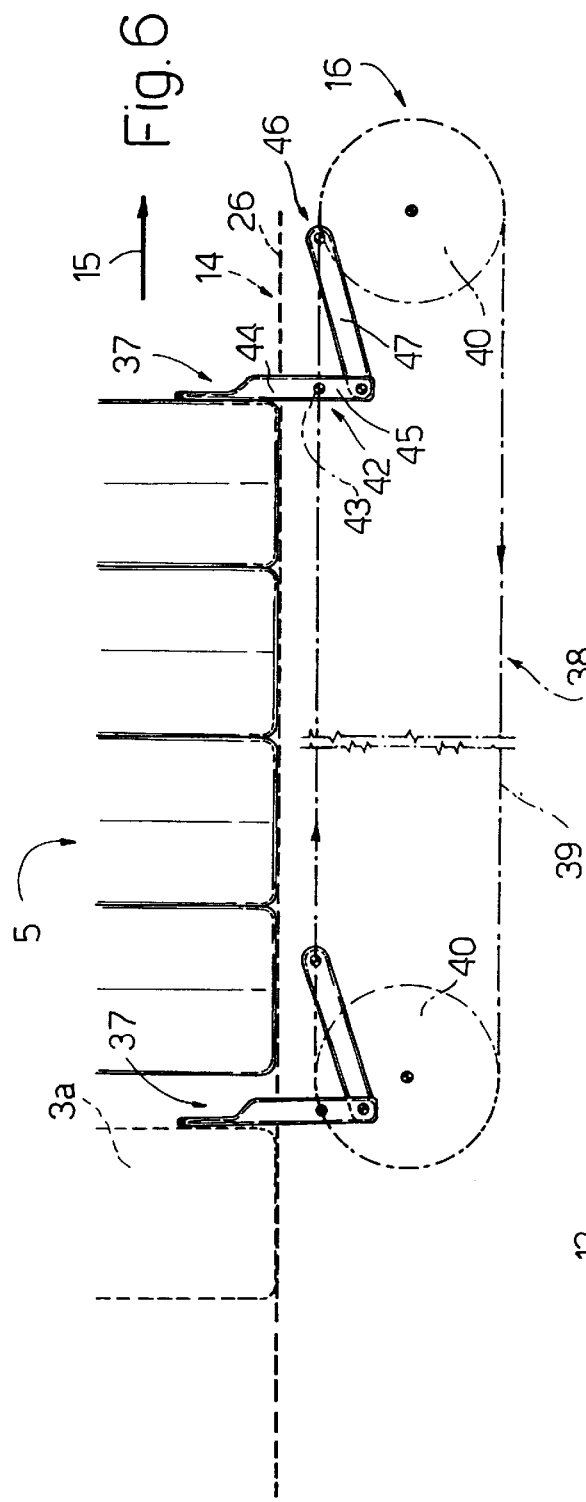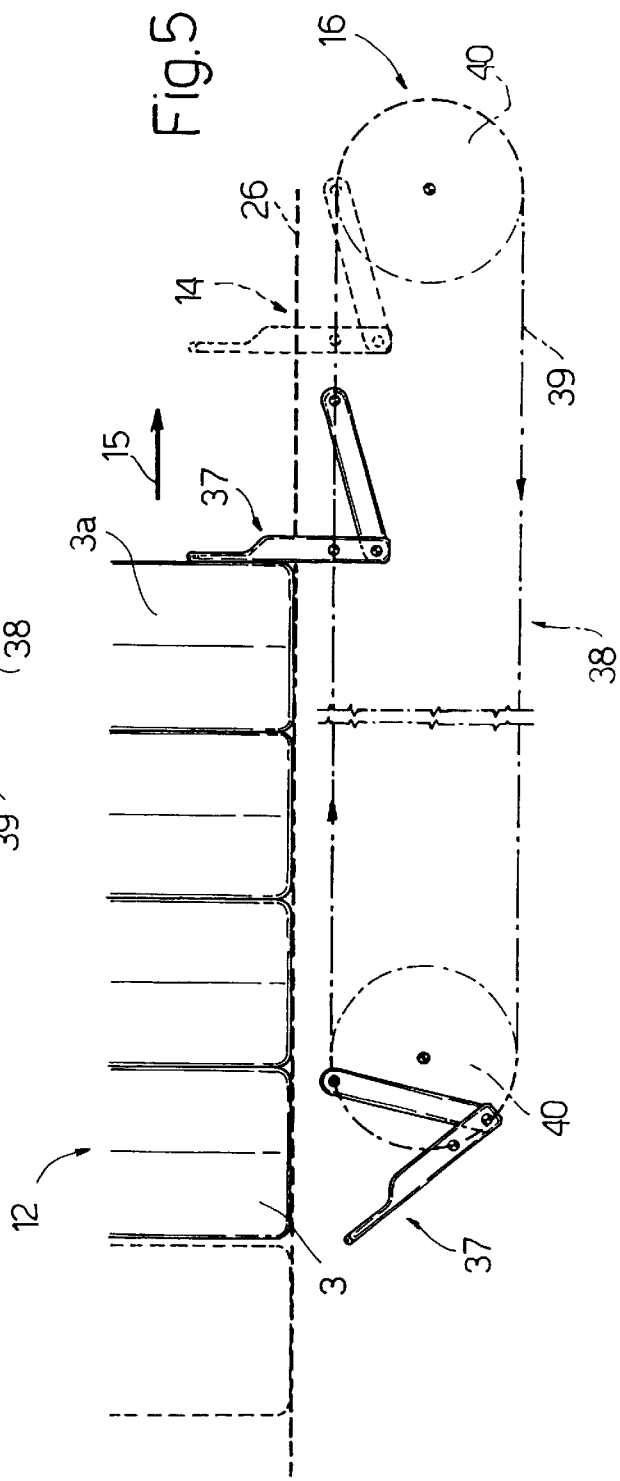

METHOD AND UNIT FOR FORMING A GROUP OF PRODUCTS ON A CARTONING MACHINE

The present invention relates to a method of forming a group of products on a cartoning machine.

The present invention may be used to advantage on machines for cartoning groups of bottles, to which the following description refers purely by way of example.

BACKGROUND OF THE INVENTION

Machines for cartoning groups of bottles normally comprise a bottle grouping unit, normally located at the input of the cartoning machine.

Known bottle grouping units, such as the one described in U.S. Pat. No. 5,667,055, subject the bottles to relatively severe mechanical stress, on account of the groups normally being formed by feeding the bottles, spaced apart, along a given path, arresting one of the bottles, and feeding the rest up against the stationary bottle to form a group which is then removed. Moreover, jostling the incoming bottles against one another and against the stationary bottle in this way obviously imposes a relatively low maximum traveling speed of the bottles.

Limiting the maximum traveling speed of the bottles in turn results in an increase in the time taken to form each group and, consequently, in relatively low productivity.

SUMMARY OF THE INVENTION

It is an object of the present invention to provide a method of forming a group of products on a cartoning machine, designed to eliminate the aforementioned drawbacks and which, at the same time, is cheap and easy to implement.

According to the present invention, there is provided a method of forming a group of products on a cartoning machine, said group comprising at least one row defined by a given number of products; the method being characterized by comprising the steps of forming an orderly succession of products; feeding said succession at a substantially constant first speed and along a first portion of a path by means of a first conveyor; feeding said succession onto a second conveyor located along a second portion of said path and traveling at a substantially constant second speed greater than the first speed; braking, on said second conveyor, a leading product in said succession, so as to cause the products of the succession to abut each other, until a portion of said succession comprising said given number of products moves onto the second conveyor; and releasing said leading product gradually so as to cause said portion to accelerate to said second speed.

The present invention also relates to a unit for forming a group of products on a cartoning machine.

According to the present invention, there is provided a unit for forming a group of products on a cartoning machine, said group comprising at least one row defined by a given number of products; the unit being characterized by comprising a compacting device for forming an orderly succession of products arranged contacting one another; a first conveyor for feeding said succession at a substantially constant first speed and along a first portion of a given path; a second conveyor located along a second portion of said path to receive said succession from said first conveyor and to convey said succession at a substantially constant second speed greater than the first speed; and braking means for engaging, on said second conveyor, a leading product in said succession, for braking the leading product until a portion of said succession comprising said given number of products moves onto the second conveyor, and for releasing said leading product gradually to enable said portion of the succession to accelerate up to said second speed.

BRIEF DESCRIPTION OF THE DRAWINGS

A non-limiting embodiment of the present invention will be described by way of example with reference to the accompanying drawings, in which:

FIG. 3 shows a larger-scale plan view of a first portion of the FIG. 1 unit;

FIG. 4 shows a larger-scale plan view of a second portion of the FIG. 1 unit;

FIGS. 5 and 6 show larger-scale views, with parts removed for clarity, of a further detail in FIG. 1 in two different operating positions.

DETAILED DESCRIPTION OF THE INVENTION

Figure 1:
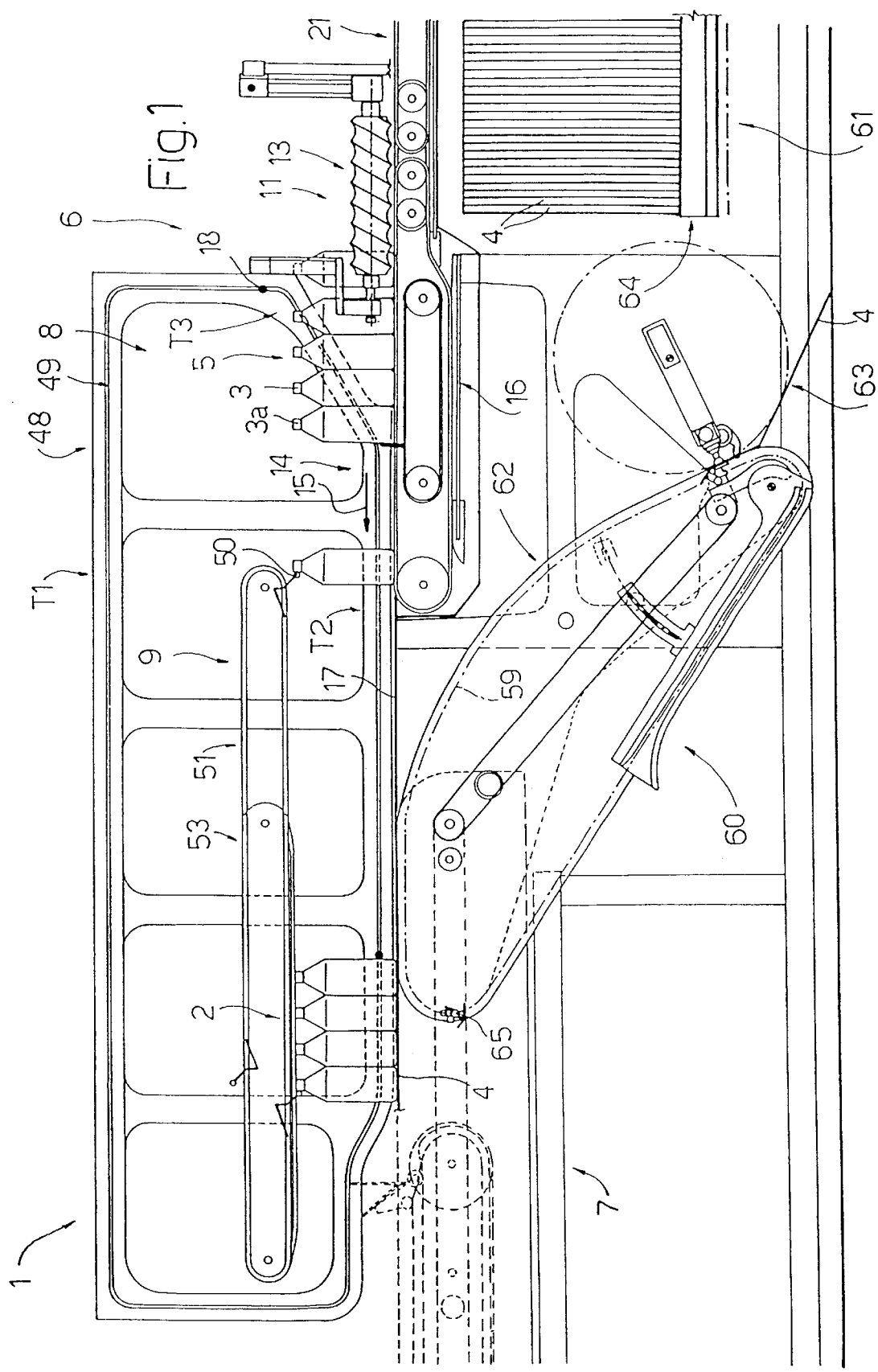
FIG. 1 shows a schematic, partially sectioned side view, with parts removed for clarity, of a preferred embodiment of the unit according to the present invention.

Number 1 in FIG. 1 indicates as a whole a cartoning machine for packing groups 2 of bottles 3 in respective flat cardboard blanks 4. Each group 2 is defined by a given N number of bottles 3 arranged in at least one row 5. In the example shown in the accompanying drawings, and particularly in FIG. 4, each group 2 is defined by sixteen bottles 3 arranged in four rows 5 of four bottles 3 each.

Cartoning machine 1 comprises an input portion defined by a group forming unit 6, which receives bottles 3 from a known filling machine (not shown) to form groups 2; and a known packing portion 7 (shown only partly by the dash line and, for example, of the type described in U.S. Pat. No. 5,148,654) where each blank 4 is folded about respective group 2 to form a finished carton (not shown).

As shown in FIG. 3, unit 6 comprises four parallel, side by side, structurally identical forming sections 8, each of which feeds respective bottles 3 along a respective straight path P to form respective rows 5, which are fed synchronously to a transverse compacting section 9 (FIG. 4) where rows 5 are compacted in a direction 10 crosswise to paths P to form a respective group 2.

Each section 8 comprises a longitudinal compacting device 11 for forming an orderly succession 12 of bottles 3; device 11 comprises a conveyor 13 for feeding succession 12 at a substantially constant speed V1 and along a first portion P1 of respective path P; and, for each section 8, a conveyor 14 which extends along a second portion P2 of respective path P to receive respective succession 12 from conveyor 13, and to convey succession 12 in a direction 15 and at a substantially constant speed V2 greater than speed V1.

As shown in FIGS. 5 and 6, each conveyor 14 comprises a braking device 16, which engages a leading bottle 3a in respective succession 12 to brake bottle 3a until a leading portion of succession 12, comprising four bottles 3, moves onto conveyor 14. At which point, braking device 16 releases bottle 3a gradually to enable the leading portion of succession 12 to accelerate up to speed V2 and so break away from succession 12 to form a respective row 5.

As shown in FIG. 4, transverse compacting section 9 comprises a static surface 17 extending along third portions P3 of the four paths P, and which is located immediately downstream from the four conveyors 14 in direction 15 to receive from the four conveyors 14 four rows 5 traveling synchronously with one another. The four rows 5 are fed along static surface 17 by a single bar 18, which engages rows 5 from behind, extends crosswise to paths P, and advances at speed V2.

Along static surface 17, two fixed converging walls 19 define a channel 20 extending along surface 17 and tapering in section in direction 15. As rows 5 are fed along channel 20 by bar 18, the tapering section of channel 20 compacts rows 5 in direction 10 to form a respective group 2, which, once formed, is fed by bar 18 to packing portion 7.

Figure 2:
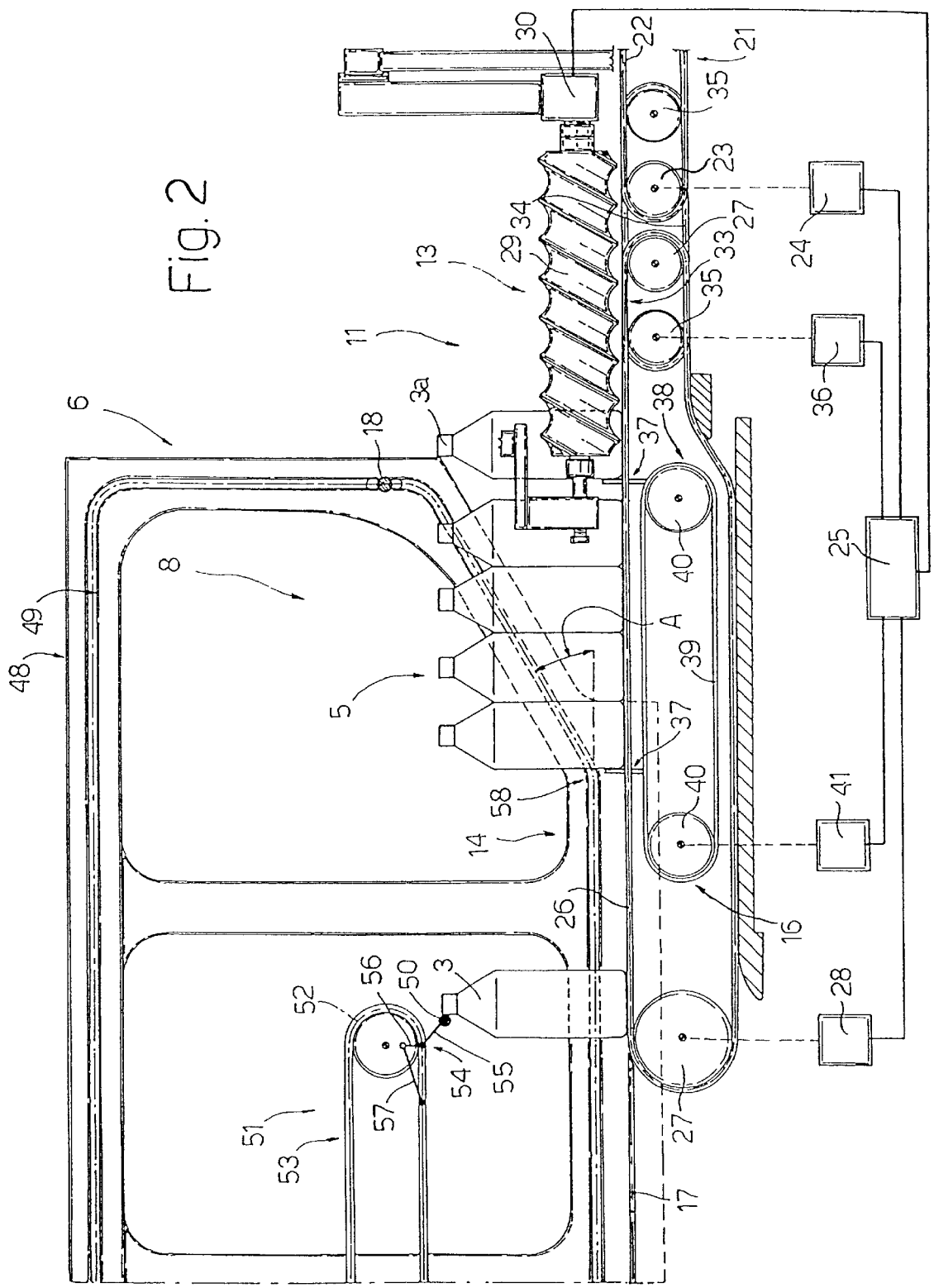
FIG. 2 shows a larger-scale view of a detail in FIG. 1.

As shown in FIGS. 2 and 3, each longitudinal compacting device 11 is associated with the output end of a respective conveyor 21, which feeds bottles 3 to respective conveyor 13 and travels at a speed V3 slightly higher than speed V1 of conveyor 13. Each conveyor 21 has two belts 22, which are located on opposite sides of respective path P, engage respective opposite ends of the bases of bottles 3, and, at the output end of conveyor 21, extend about respective pulleys 23 rotated at the same constant angular speed by a motor 24 controlled by a control unit 25.

Each conveyor 14 has two belts 26, which are located on opposite sides of respective path P, are coplanar with belts 22, engage respective opposite ends of the bases of bottles 3, and extend about respective pairs of pulleys 27. One pulley in each pair is rotated at constant angular speed by a motor 28 controlled by control unit 25.

Respective conveyor 13 extends between the two conveyors 21 and 14 of each section 8, and comprises two screws 29, which extend along and on opposite sides of respective path P, are connected to a motor 30 controlled by control unit 25 to rotate at constant angular speed about respective axes 31 parallel to path P, extend along an output portion of conveyor 21 and along an input portion of conveyor 14, over respective belts 22 and 26, and together define a succession of equally spaced seats 32. As screws 29 rotate about respective axes 31, each seat 32 moves at speed V1 and engages diametrically opposite surface portions of a respective bottle 3.

As shown in FIG. 3, the screw 29 located between two side by side conveyor 13 is shared by both conveyors 13.

Each conveyor 13 also comprises a chain conveyor 33, which is coplanar with conveyors 14 and 21, is located between conveyors 14 and 21 to continuously support bottles 3 engaged by screws 29, and comprises a chain 34 extending about two end gears 35, one of which is powered by a motor 36 to rotate at least at speed V1.

As shown in FIGS. 2, 5 and 6, each braking device 16 comprises two stop bodies 37, each of which is located between belts 26 of respective conveyor 14, and is fed along respective path P by a respective conveyor 38 at a variable speed V4, substantially ranging between speeds V1 and V2, to engage and brake a respective leading bottle 3a in corresponding succession 12.

Each of conveyors 38 (each of which is shown partly in FIG. 6) comprises an endless chain 39, which extends along an intermediate portion of relative conveyor 14, is located below corresponding belts 26, and extends about two end gears 40, one of which is rotated at variable angular speed by a motor 41 controlled by control unit 25.

Control unit 25 controls each motor 41 and relative motor 30 synchronously, so that corresponding screws 29 time the travel of bottles 3 along respective path P with the travel of each body 37 to enable body 37 to engage and brake a respective bottle 3a.

A rocker arm 42 is hinged to each chain 39 to oscillate about an axis 43 crosswise to respective path P, and comprises an arm 44, an end portion of which is defined by respective stop body 37, and an arm 45. Each rocker arm 42 is associated with a control device 46 for controlling the angular position of rocker arm 42 about respective axis 43, and which comprises a connecting rod 47 hinged at one end to respective arm 45 and at the opposite end to respective chain 39.

Each stop body 37 is fed by respective chain 39 along an endless path comprising four successive portions: a straight rest portion, along which body 37 is fed below the conveying surface, defined by belts 26, of bottles 3; a curved engage portion, along which body 37 is fed about the input gear 40 and gradually brought level with the conveying surface of bottles 3 to gradually engage a respective bottle 3a; a straight work portion, along which body 37 projects upwards through the conveying surface of bottles 3 to engage and brake bottle 3a; and a curved release portion, along which body 37 is fed about gear 40 and gradually below the the conveying surface of bottles 3 to gradually release bottle 3a.

Along the engage, work, and release portions, each control device 46 keeps respective rocker arm 42 substantially perpendicular to respective path P. In particular, along the engage portion, stop body 37 is moved up onto a level with the conveying surface of bottles 3 with body 37 substantially perpendicular to respective path P, and therefore with a minimum longitudinal dimension of body 37 with respect to path P.

As shown in FIG. 1, each bar 18 is advanced at speed V2 by a belt actuating device 48 associated with two endless guides 49 (only one shown in FIG. 1), which are positioned parallel and facing each other, extend on opposite sides of unit 6, and engage in sliding manner respective opposite ends of bars 18.

Each guide 49 comprises a rest portion T1, along which bars 18 travel over bottles 3; and a work portion T2, along which each bar 18 travels parallel to paths P and at a distance from the conveying surface of bottles 3 equal to less than the height of bottles 3, so as to engage bottles 3 from behind. Portions T1 and T2 are connected by an approach portion T3 having an end portion sloping at a given angle A (FIG. 2) with respect to paths P.

Unit 6 also comprises a number of bars 50, each of which simultaneously engages four rows 5 of bottles 3 at the front, and is advanced by an actuating device 51 at speed V2 along a path 52 (FIG. 2) extending parallel to paths P from respective output portions of conveyors 14. Actuating device 51 comprises two chain conveyors 53 (only one shown in FIG. 1), each of which advances at speed V2, supports bars 50, and extends over bottles 3 traveling along paths P.

As shown in FIG. 2, each bar 50 is fitted to each conveyor 53 by a rocker arm 54 hinged to conveyor 53 and comprising an arm 55 supporting bar 50, and an arm 56 connected to one end of a connecting rod 57.

Operation of forming unit 6 will now be described with reference to one group 2, and as of the instant in which respective bottles 3 are conveyed by the four conveyors 21.

As shown in FIG. 3, each conveyor 21 receives bottles 3 from the filling machine (not shown) in random order, and feeds bottles 3 at speed V3 to respective conveyor 13, where each bottle 3 engages a respective seat 32 and is conveyed at speed V1.

Since speed V1 is lower than speed V3, the bottles 3 on each conveyor 21 are slowed down and slide along respective belts 22 on reaching the input end of respective conveyor 13, so that a respective orderly succession 12 of in-line bottles 3 comprising a respective lead bottle 3a is formed as of the input end of respective conveyor 13.

Each succession 12 is conveyed by respective screws 29 at speed V1 and fed gradually to respective conveyor 14; and, on leaving screws 29, the lead bottle 3a in succession 12 is engaged by a respective stop body 37 traveling substantially at speed V1.

As shown in FIGS. 5 and 6, as four bottles 3 are fed onto respective conveyor 14, respective stop body 37 is accelerated gradually to accelerate and detach the four bottles 3 from succession 12 and form a respective row 5; and the next lead bottle 3a, in the same succession 12, to leave screws 29 is engaged by the other stop body 37 to form the next row 5.

As shown in FIG. 2, as stop body 37 is accelerated to form a respective row 5, control unit 25 regulates the traveling speed of body 37 to a value ranging between speeds V1 and V2 to enable a corresponding bar 18, traveling along respective guides 49 at speed V2, to engage row 5 from behind before row 5 is released by body 37. In this connection, it should be stressed that bar 18 catches up with row 5, not only by control unit 25 controlling the speed of row 5, but also as a function of the slope angle A of approach portion T3 of guides 49. Along portion T3, a traveling speed V5 of bar 18 along path P equals V2 multiplied by the cosine of angle A; and angle A is so selected that V5 is greater than V1 and substantially equal to the speed assumed by bottle 3a at the output point 58 of portion T3.

Control unit 25 synchronizes the travel of bars 18 and 50 so that a bar 50 engages a respective row 5 at the front after row 5 is engaged from behind by a respective bar 18.

At this point, and as shown in FIG. 4, the four rows 5, engaged at the front and rear by bars 50 and 18 respectively, leave respective conveyors 14 and are fed onto static surface 17, along which the four rows 5 are compacted in direction 10 by channel 20 to form a respective group 2.

As shown in FIG. 1, once formed, group 2 is fed to packing portion 7 where group 2 is eased onto a respective blank 4, which is fed, beneath and synchronously with group 2, by a supply device 60 to packing portion 7 along a supply path 59 which joins up with path P.

The above operations are repeated cyclically to form successive group 2.

Supply device 60 comprises a store 61; a conveyor 62 traveling at variable speed along supply path 59; and a pickup device 63 for withdrawing a blank 4 from an output 64 of store 61 and feeding blank 4 to conveyor 62, which supports a number of grippers 65, each of which engages a front end of a respective blank 4 to draw blank 4 along path 59.

As shown in FIG. 3, plates 66 are provided on either side of conveyors 14 and 21 to retain bottles 3 in a direction perpendicular to path P, and are so fastened (not shown) as to be changeable rapidly to adapt the machine fairly quickly to bottles 3 of different sizes.

When forming group 2, as described above, on forming unit 6, collision between bottles 3 only occurs during the formation of succession 12, and only involves a bottle 3 traveling at speed V1 of conveyor 13, and a following bottle 3 traveling at speed V3 of conveyor 21. And, since, as stated, speed V3 is only slightly greater than speed V1, bottles 3 only collide to a relatively small extent involving very little mechanical stress of bottles 3.

Moreover, during transfer between respective conveyor 14 and static surface 17, and as it travels along static surface 17, each row 5 is engaged at the front and rear by bars 50 and 18 respectively, so that the stability of each row 5 is substantially assured.

In particular, the stability of each row 5, and therefore of each group 2 of bottles 3, is also assured at the end edge of static surface 17 where support of the bottles passes from surface 17 to blank 4, and despite the change in level at the end edge due to the albeit minimum thickness of static surface 17 and the distance between the end edge of the static surface and path 59, and therefore blank 4. Which distance is anyway minimized by grippers 65 of conveyor 62 retaining blank 4 at the front, with respect to the traveling direction of the blank, and conveying the blank by gripping it on the opposite side to static surface 17. This also has the advantage of enabling the use of less than perfectly flat blanks 4, which have undergone deformation due to atmospheric conditions during transport or storage prior to use, or due to the poor quality of the material from which they are made.

What is claimed is:
1. A method of forming a group (2) of products (3) on a cartoning machine (1), said group (2) comprising at least one row (5) defined by a given number of products (3); the method comprising the steps of forming an orderly succession (12) of products (3); feeding said succession (12) at a substantially constant first speed (V1) and along a first portion (P1) of a path (P) by means of a first conveyor (13); feeding said succession (12) onto a second conveyor (14) located along a second portion (P2) of said path (P) and traveling at a substantially constant second speed (V2) greater than the first speed (V1); braking, on said second conveyor (14), a leading product (3a) in said succession (12) until a portion of said succession (12) comprising said given number of products (3) moves onto the second conveyor (14) with the products in the portion abutting one another, and releasing said leading product (3a) gradually to accelerate said portion to said second speed (V2) so as to cause said portion to detach from said succession (12) to form said row (5).

2. A method as claimed in claim 1, characterized in that said step of braking said leading product (3a) on said second conveyor (14) comprises feeding a stop body (37) into contact with the leading product (3a) and along an initial portion of said second conveyor (14); said stop body (37) being conveyed initially at said first speed (V1), being subsequently accelerated, and then being released from said leading product (3a).

3. A method as claimed in claim 2, characterized in that said step of feeding said succession (12) on said first conveyor (13) comprises timing said products (3) with respect to said stop body (37).

4. A method as claimed in claim 2, characterized in that said row (5) is engaged from behind, in a traveling direction along said path (P), by a first bar (18) crosswise to said path (P) and traveling at substantially the same speed as said row (5); said first bar (18) coming into contact with said row (5) after the row (5) is released by the first conveyor (13).

5. A method as claimed in claim 4, characterized in that said row (5) is fed by said first bar (18) along a static surface (17) extending along a third portion (P3) of said path (P) and immediately downstream from said second conveyor (14) in a traveling direction (15) of said row (5) along said path (P).

6. A method as claimed in claim 5, characterized in that said row (5) is engaged at the front, with reference to the traveling direction (15) along said path (P), by a second bar

(50) crosswise to said path (P) and traveling substantially at said second speed (V2); said second bar (50) coming into contact with said row (5) just before the row (5) engages said static surface (17).

7. A method as claimed in claim 1, characterized in that said group (2) comprises a number of side by side rows (5); the method comprising, after the formation of said rows (5), the further step of compacting said rows (5) transversely with respect to said path (P) to form said group (2).

8. A method as claimed in claim 6, characterized in that said rows (5) are compacted, as they travel along said static surface (17), by means of fixed walls (19) forming a channel (20) tapering in section in the traveling direction (15) of the rows (5) along said path (P).

9. A unit for forming a group (2) of products (3) on a cartoning machine (1), said group (2) comprising at least one row (5) defined by a given number of products (3); the unit comprising a compacting device (11) for forming an orderly succession (12) of products (3); a first conveyor (13) for feeding said succession (12) at a substantially constant first speed (V1) and along a first portion (P1) of a path (P); a second conveyor (14) located along a second portion (P2) of said path (P) to receive said succession (12) from said first conveyor (13) and to convey said succession (12) at a substantially constant second speed (V2) greater than said first speed (V1); and braking means (16) for engaging, on said second conveyor (14), a leading product (3a) in said succession (12) until a portion of said succession (12) comprising said given number of products (3) moves onto said second conveyor (14) with the products in the portion abutting one another, and for releasing said leading product (3a) gradually to enable said portion of the succession (12) to accelerate up to said second speed (V2).

10. A unit as claimed in claim 9, characterized in that said braking means (16) comprise at least one stop body (37); and a fourth conveyor (38) supporting said stop body (37) and extending parallel to said second conveyor (14) along an initial portion of the second conveyor (14); actuating means (41) being connected to said fourth conveyor (38) to move the fourth conveyor (38) at a variable fourth speed (V4) substantially ranging between said first speed (V1) and said second speed (V2).

11. A unit as claimed in claim 10, characterized in that said fourth conveyor (38) comprises an endless chain (39); two end gears (40) about which said chain extends; a motor (41) forming part of said actuating means (41) and connected to one of said two gears (40) to rotate said gear (40) at a variable angular speed; a rocker arm (42) hinged to said chain (39) to oscillate about an axis (43) crosswise to said path (P), and having a first arm (44), an end portion of which is defined by said stop body (37), and a second arm (45); and a connecting rod (47) hinged at one end to said second arm (45) and at the opposite end to said chain (39).

12. A unit as claimed in claim 10, characterized in that said braking means (16) comprise two said stop bodies (37); and two independent said fourth conveyors (38), each of which supports a respective said stop body (37).

13. A unit as claimed in claim 10, characterized in that said first conveyor (13) comprises timing means (29) for timing said products (3) with respect to a respective said stop body (37).

14. A unit as claimed in claim 13, characterized in that said compacting device (11) is associated with a third conveyor (21), which feeds said products (3) to said first conveyor (13) and travels at a third speed (V3) greater than said first speed (V1).

15. A unit as claimed in claim 14, characterized in that said second and third conveyors (14, 21) are belt conveyors located in series along said path (P); said first conveyor (13) comprising two screws (29), which extend along and on opposite sides of said path (P), are powered to rotate continuously about respective axes (31) parallel to said path (P), extend from an end portion of said third conveyor (21) to an initial portion of said second conveyor (14), and define, in between, at least one seat (32) traveling at said first speed (V1) and for conveying a said product (3).

16. A unit as claimed in claim 15, characterized in that said first conveyor (13) also comprises a conveyor (33) located between said two screws (29) and traveling at said first speed (V1).

17. A unit as claimed in claim 9, characterized by also comprising a first bar (18) crosswise to said path (P); a first actuating device (48) being connected to said first bar (18) to move the first bar (18) parallel to said path (P) so as to engage said row (5) from behind in a traveling direction (15) along said path (P).

18. A unit as claimed in claim 17 characterized in that said first actuating device (48) is associated with a first guide (49), which is engaged in sliding manner by said first bar (18) and comprises a work portion (T2) parallel to said path (P), and an approach portion (T3) located upstream from said work portion (T2) and sloping at a given angle with respect to said path (P).

19. A unit as claimed in claim 18, characterized by also comprising a static surface (17), which extends along a third portion (P3) of said path (P), and is located immediately downstream from said second conveyor (14) in a traveling direction (15) of said row (5) along said path (P) and at a portion of said work portion (T2).

20. A unit as claimed in claim 19, characterized by also comprising a second bar (50) crosswise to said path (P); a second actuating device (51) being connected to said second bar (50) to move the second bar (50) parallel to said path (P) so as to engage said row (5) at the front in a traveling direction (15) along said path (P).

21. A unit as claimed in claim 20, characterized in that said second actuating device (51) comprises a fifth conveyor (53) supporting said second bar (50) and extending at least over said static surface (17).

22. A unit as claimed in claim 9, characterized in that said group (2) comprises a number of side by side rows (5).

23. A unit as claimed in claim 19, characterized by comprising fixed walls (19) defining a channel (20) extending along said static surface (17); said channel (20) having a section tapering in a traveling direction (15) of the rows (5) along said path (P).

24. A method of forming a group (2) of products (3) on a cartoning machine (1), said group (2) comprising at least one row (5) defined by a given number of products (3), the method comprising the steps of forming an orderly succession (12) of products (3); feeding said succession (12) of products (3) at a substantially constant first speed (V1) and along a first portion (P1) of a path (P) by means of a first conveyor (13); feeding said succession (12) of products (3) onto a second conveyor (14) located along a second portion (P2) of said path (P) and traveling at a substantially constant second speed (V2) greater than said first speed (V1);

braking, on said second conveyor (14), a leading product (3a) in said succession (12) until a portion of said succession (12) comprising said given number of products (3) moves onto said second conveyor (14) with the products in the portion abutting one another, said braking comprising contacting the leading product (3a) with stopping means (37) for stopping the leading product along an initial portion of said second conveyor (14); said stopping means (37) being conveyed initially at said first speed (V1), and being subsequently accelerated; and then releasing said stopping means from said leading product (3a) to cause said portion gradually to accelerate to said second speed (V2) and detaching said portion from said succession (12) to form said row (5);

said row (5) being engaged from behind, in a traveling direction along said path (P), by a first bar (18) that is disposed crosswise to said path (P) and traveling at substantially the same speed as said row (5); said first bar (18) coming into contact with said row (5) after the row (5) leaves the first conveyor (13).

25. A unit for forming a group (2) of products (3) on a cartoning machine (1), said group (2) comprising at least one row (5) defined by a given number of products (3), the unit comprising a compacting device (11) for forming an orderly succession (12) of products (3); a first conveyor (13) for feeding said succession (12) at a substantially constant first speed (V1) and along a first portion (P1) of a path (P); a second conveyor (14) located along a second portion (P2) of said path (P) to receive said succession (12) from said first conveyor (13) and to convey said succession (12) at a substantially constant second speed (V2) greater than said first speed (V1); braking means (16) for engaging, on said second conveyor (14), a leading product (3a) in said succession (12) until a portion of said succession (12) comprising said given number of products (3) moves onto said second conveyor (14) with the products in the portion abutting one another, and for releasing said leading product (3a) gradually to enable said portion to accelerate to said second speed (V2); a first bar (18) disposed crosswise to said path (P); and first actuating means (48) connected to said first bar (18) for moving the first bar (18) parallel to said path (P) so as to engage said row (5) from behind in a traveling direction (15) along said path (P), said first actuating means (48) being associated with a first guide (49), which is engaged in sliding manner by said first bar (18) and comprises a work portion (T2) parallel to said path (P), and an approach portion (T3) disposed upstream from said work portion (T2) and sloping at a given angle with respect to said path (P).

* * * * *

UNITED STATES PATENT AND TRADEMARK OFFICE
CERTIFICATE OF CORRECTION

PATENT NO. : 6,308,817 B1
DATED : October 30, 2001
INVENTOR(S) : Carlo Corniani et al.

It is certified that error appears in the above-identified patent and that said Letters Patent is hereby corrected as shown below:

<u>Title page,</u>
Item [30], "23" should read -- 13 -- and "B098A0573" should read -- BO98A0573 --;

Item [73], "Azionario" should read -- Azionaria --.

Signed and Sealed this

Nineteenth Day of March, 2002

Attest:

JAMES E. ROGAN
Attesting Officer *Director of the United States Patent and Trademark Office*